Feb. 7, 1939.  R. V. P. KOHLHEPP  2,146,582
FISHING REEL
Filed March 23, 1938
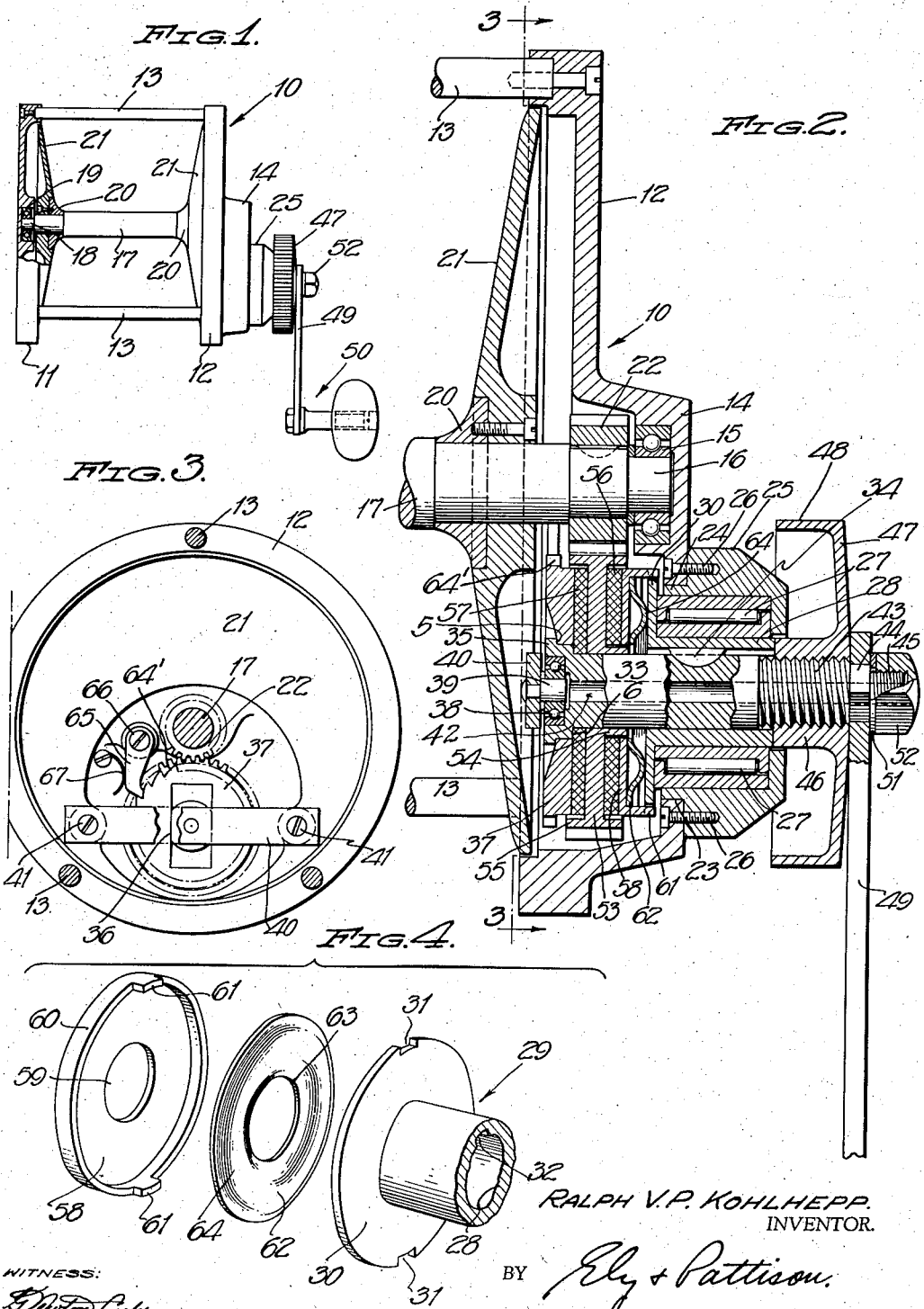
RALPH V. P. KOHLHEPP,
INVENTOR.
BY Ely & Pattison,
ATTORNEYS.

Patented Feb. 7, 1939

2,146,582

UNITED STATES PATENT OFFICE 2,146,582

FISHING REEL

Ralph V. P. Kohlhepp, Plainfield, N. J.

Application March 23, 1938, Serial No. 197,685

6 Claims. (Cl. 242—84.5)

This invention relates to improvements in fishing reels and more particularly to fishing reels of the large type for use in salt water fishing when angling for big game fish.

One of the important objects of the invention resides in a novel friction drive tension mechanism equivalent to what is generally termed a "star drag" which enables the "reeling in" of a hooked fish while maintaining the line in a taut tensioned condition to avoid any slack in the line which if present therein might result in the fish freeing itself from the line.

Another feature of the invention is to provide a fishing reel of the above type in which the tension upon the friction drive mechanism may be easily and quickly adjusted to suit the occasion, for it will be understood the degree of pull, weight, and gameness of the fish may vary on each catch.

A further feature of the invention is the provision of a fishing reel having a friction drive mechanism which will not heat up to any harmful degree which might tend to burn the hand of a user during a lengthy reeling in operation which is sometimes necessary for the successful landing of large game fish.

A still further object of the invention is to provide a fishing reel having an adjustable friction drive mechanism which is simple of construction, inexpensive of manufacture, easy of assembly and disassembly of the parts to facilitate replacement or repair of the parts should the occasion arise.

With these and other objects in view, the invention resides in the certain novel construction, combination and arrangement of parts, the essential features of which are fully described in the following specification, are particularly pointed out in the appended claims, and are illustrated in the accompanying drawing in which, Figure 1 is a rear elevational view of a reel constructed in accordance with the invention with parts in section.

Figure 2 is an enlarged detail vertical longitudinal sectional view through the driving mechanism of the reel.

Figure 3 is a vertical sectional view on the line 3—3 of Figure 2.

Figure 4 is an extended collective perspective view of one of the friction plates, spring tension washer, and tension actuating device.

Referring to the drawing by reference characters, the numeral 10 designates my improved fishing reel in its entirety which includes end heads 11 and 12 which are connected together and held in spaced relation by pillars or posts 13. The end head 12 is provided with an outwardly extending housing 14 in which a roller bearing 15 is mounted and on which one of the reduced ends 16 of a shaft 17 is journaled. The opposite reduced end 18 of the shaft is journaled in a roller bearing 19 mounted in the end head 11. Collars 20 are fixed to reduced portions of the shaft 17 adjacent opposite ends and to which spool heads 21 are fixedly connected and which combined with the intermediate portion of the shaft 17 constitutes a spool for the winding of a length of fishing line. A driving pinion 22 is keyed to the shaft 17 adjacent the bearing 15 and is disposed within the housing 14.

The front wall of the housing 14 is provided with a round opening 23 in which is fitted the reduced inwardly extending flange 24 of a bearing member 25 which is secured to the front of the housing 14 by screws 26. Mounted within the bearing member 25 is a roller bearing 27 in which the sleeve portion 28 of a tension actuating member 29 is journaled. The inner end of the sleeve 28 has a disk 30 formed integral therewith, and which disk has diametrically oppositely disposed notches 31 in the periphery thereof for a purpose to be presently explained. The inner wall of the sleeve portion 28 is provided with a longitudinal key way 32. The front wall of the bearing member 25 is provided with an opening in axial alinement with the sleeve portion 28 and of a diameter to enable the outer end of the sleeve portion to extend thereinto.

Extending through the sleeve portion 28 is a driving shaft 33 to which the sleeve portion is slidably keyed by a key 34 which is carried by the shaft 33 and freely fits into the keyway 32 whereby the tension actuating disk 29 will turn with the shaft 33 and slide longitudinally relative to the shaft. The inner end of the shaft 33 is provided with a head 35 having opposed flat sides 36 on which a friction plate 37 is mounted for turning movement with the shaft. The head end of the shaft 33 is provided with an outer shoulder 5 against which the outer side of the friction plate 37 abuts, and with a stepped down inner shoulder 6. The head end of the shaft 33 is recessed to receive an outer friction ball bearing 38, which bearing surrounds the inwardly extending portion of a stud shaft 39 fixed to a bar 40 which bridges the open inner side of the housing 14 and secured to the end head 12 by screws 41. The shaft 33 is provided with a bore 42 extending axially the length thereof whereby oil may be introduced into the outer end of the shaft for lubricating the bearing 38 without requiring the disassembly of the parts.

The outer end of the shaft 33 is externally stepped down in cross section to provide a screw thread portion 43, a square portion 44, and an extreme outer screw thread portion 45. Threaded to the screw thread portion 43 is the hub 46 of a tension adjusting wheel 47, the same having an inwardly extending knurled peripheral flange 48, the diameter of which is greater than the diameter of the bearing member 25 to telescope with the same during inward turning movement of the wheel 47. The inner end of the hub 46 is in constant abutting engagement with the outer end of the sleeve portion 28 of the disk 30 for a purpose to be hereinafter explained.

Fitting onto the square portion 44 of the shaft 33 is one end of an arm 49 of a crank handle 50, the said arm having a square opening to tightly receive the portion 44. A washer 51 fits onto the outer threaded end 45 of the shaft and is held clamped against the arm 49 by a nut 52 threaded on the threaded end 45 and which acts to releasably secure the crank handle 50 to the drive shaft 33.

Freely mounted on the drive shaft 33 and in constant mesh with the driving pinion 22 is a driving gear 53 having an inwardly extending hub 54. The opposed sides of the gear 53 are flat and fitting thereagainst and disposed within the plane of the side edges of the outer toothed peripheral flange 55 thereof are friction washers or disks 56 and 57 which may be constructed of brake lining material or other material having similar friction and long wear characteristics. The friction washer 56 fits about the hub 54 of the driving gear 53 while the friction disk 57 fits about the shaft 33 and is disposed between the inner face of the gear 53 and the outer flat face of the friction plate 37 and stop shoulder 6.

Fitting against the outer face of the friction washer 56 is a friction plate 58 having a central opening 59 which freely receives the hub 54 of the driving gear 53 and on which the friction plate is slidably supported. The friction plate 58 is provided with an outwardly extending peripheral flange 60 having diametrically opposed outwardly extending lugs 61—61 extending from the edge thereof and which freely extend into the notches 31 of the tension actuating disk 30.

Fitting against the outer side of the friction plate 58 is a metal spring washer 62 having a central opening 63 of a diameter slightly greater than the diameter of the hub 54 to ride over the hub. The external diameter of the washer 62 is equal to the internal diameter of the flange 60 so as to tightly fit therein and center the spring washer axially with respect to the axis of the shaft 33. The spring washer 62 is provided with an outwardly bulged portion 64 extending circumferentially therearound, the said bulged portion being disposed inwardly of the edges of the washer and normally extending to a plane beyond the outer peripheral edge of the flange 60 and disposed in abutting engagement with the tension actuating disk 30.

For preventing retrograde movement of the reel drive mechanism, I provide ratchet teeth 64' on the periphery of the friction disk plate 37, which teeth are engaged by a pawl 65 pivoted to the end head 12 as at 66. A spring 67 urges the pawl 65 into engagement with the peripheral tooth edge of the disk plate 37. The pawl locks the plate 37 against retrograde movement and rides over the ratchet teeth during the forward winding rotation imparted to the shaft 33 by means of the handle 50.

From the foregoing description, it will be understood that a friction clutch connection is provided between the drive shaft 33 and the driving gear 53, by reason of the friction plates 37 and 58, friction washers 56, and 57, spring washer 62, and tension actuating member 29 which is keyed to the drive shaft 33. The amount of friction of the friction clutch connection is determined by the inward and outward movement of the tension actuating member 29 relative to the spring washer 62, and which member 29 is slid in and out upon the reverse turning movements manually imparted to the tension adjusting wheel 47. When the wheel 47 is turned clockwise, it threads inwardly upon the shaft 33 and pushes the tension actuating member 29 inwardly against the bulge portion on the spring washer 62, tending to flatten the washer and accordingly bringing the two friction clutch plates and friction washers 56 and 57 into tighter engagement with the opposite sides of the drive gear 53. By turning the wheel 47 in a counterclockwise direction, the reverse action takes place, namely, the tension between the clutch elements is reduced, the spring washer 62 acting to force the tension actuating member 29 outwardly and accordingly reducing the tension of the friction connection.

Assume that one end of a fishing line is connected to the winding shaft 17 and the reel 10 is in use upon a fishing rod. The tension of the friction connection between the drive shaft 33 and the driving gear 53 is set to enable the manual winding-in of the line upon turning of the crank handle, for the tension is sufficient to effect a constant drive between the shaft 33, driving gear 53 and driving pinion 22, the latter pinion being fixed to the winding shaft 17 of the reel spool. Should a fish be caught upon the line and the weight or fighting pull of the fish exceed the tension of the friction drive connection, the wheel 47 may be turned to proportionately increase the tension to meet the occasion. The purpose of fishing reels of this type is to maintain the fishing line in taut condition to prevent a caught fish from taking advantage of any slack in the line and which may give the fish an opportunity of throwing the hook from its mouth or in some other manner free itself from the hook. By providing an adjustable drag mechanism, the line may be run out under tension when the pull of the fish overcomes the tension, and further eliminates fouling and breaking of a line in landing a large game fish of the deep salt water variety.

By reason of the novel construction and arrangement of the parts, any repair or replacement of worn parts may be easily and readily made, and the reel maintained in an efficient running condition.

While I have shown and described what I deem to be the preferred embodiment of my invention, it is understood that such alterations and modifications as come within the scope of the appended claims may be resorted to if desired.

Having thus described the invention, what I claim as new and desire to secure by Letters Patent of the United States, is:—

1. In a fishing reel, a friction drag mechanism comprising a drive shaft, a driving gear mounted on said drive shaft and rotatable relative thereto, a non-slidable friction element disposed at one side of said driving gear, a slidable friction element disposed on the opposite side of said driving gear, a tension actuating member slidably keyed to said drive shaft, a key connection between said actuating member and said slidable friction element, a spring tension washer interposed between said sliding friction element and the inner end of said tension actuating member, and a manually operated member threaded to said drive shaft and engageable with the outer end of said tension actuating member for regulating the tension of said spring tension washer to effect a friction drive connection between said drive shaft and said driving gear.

2. In a fishing reel, a friction drag mechanism comprising a drive shaft, a driving gear freely mounted on said drive shaft, a non-slidable friction element mounted on said shaft and disposed at one side of said driving gear, a slidable friction element disposed on the opposite side of said driving gear, a disk disposed in spaced relation to said slidable friction element and connected thereto, a sleeve integral with said disk and slidably keyed to said drive shaft, a tension spring washer surrounding said shaft and interposed between said sliding friction element and said disk, and a manually actuated member threaded to said drive shaft in abutting engagement with the outer free end of said sleeve for sliding said sleeve and disk inwardly against the tension of said spring washer to regulate the friction between opposite sides of said driving gear and the respective friction elements.

3. In a fishing reel, a friction drag mechanism comprising a driving shaft, a driving gear freely mounted on said driving shaft, a non-slidable friction element fixedly mounted on said shaft and disposed at one side of said driving gear, a slidable friction element disposed at the opposite side of said driving gear and having a disk body provided with an axially outwardly extending peripheral flange, a disk plate disposed in spaced relation to said disk body, interfitting means between the flange and said disk plate for keying the same together for turning movement with each other, a spring tension washer interposed between said disk body and said disk plate, a sleeve integral with and extending outwardly from said disk body and slidably keyed to said driving shaft, and an actuating member threaded to the driving shaft and disposed in abutting engagement with the outer end of said sleeve to facilitate the inward sliding movement of said sleeve and disk plate against the tension of said spring washer upon the turning of said actuating member in one direction.

4. In a fishing reel, a friction drag mechanism comprising a driving shaft, a driving gear freely mounted on said driving shaft, a disk plate fixed to said shaft at one side of said driving gear, a disk plate at the opposite side of said driving gear free of said shaft, friction washers interposed between opposite sides of said driving gear and the respective disk plates, an actuating member disposed in spaced relation to said free disk plate, a slidable key connection between said actuating member and the adjacent disk plate, a spring tension washer interposed between said actuating member and the spaced adjacent disk plate, means slidably connecting said actuating member to said driving shaft, and a manually actuated element threaded to said driving shaft and engageable with said actuating member for sliding the same inwardly against the tension of said spring washer to compress said friction washers into tight frictional engagement with opposite sides of said driving gear.

5. In a fishing reel, a drag mechanism comprising a driving shaft, a driving gear freely mounted on said driving shaft, a clutch plate fixed to said driving shaft, and disposed in adjacent spaced relation to one side of said driving gear, a compressible friction washer interposed between said fixed clutch plate and the adjacent side of said driving gear, a sliding clutch plate disposed on the other side of said driving gear and disposed in spaced relation to the adjacent side of said driving gear, a compressible friction washer interposed between said sliding clutch plate and the adjacent side of said driving gear, an annular flange extending axially outwardly from the perimeter of said sliding clutch plate, diametrically opposed lugs extending from said flange, a disk plate having diametrically opposed notches in the periphery thereof and receiving the respective lugs, a spring washer interposed between said sliding clutch plate and said disk plate, a sleeve integral with and extending outwardly from said disk plate and slidably keyed to said driving shaft, and an actuating wheel threaded to the driving shaft and disposed in abutting engagement with the outer end of said sleeve whereby turning of said wheel in one direction will cause said clutch plates to coact and compress said friction washers into tight frictional engagement with opposite sides of said driving gear.

6. In a fishing reel as set forth in claim 5, including a reel frame having an end head, a bearing in said end head for said sleeve, and a bearing supported by said end head on which the inner end of said driving shaft is journaled.

RALPH V. P. KOHLHEPP.